US010372462B2

(12) United States Patent
Reunamaki et al.

(10) Patent No.: US 10,372,462 B2
(45) Date of Patent: Aug. 6, 2019

(54) METHOD AND APPARATUS FOR DEVICE SETUP

(71) Applicant: Nokia Technologies Oy, Espoo (FI)

(72) Inventors: Jukka Reunamaki, Tampere (FI); Arto Palin, Akaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 286 days.

(21) Appl. No.: 15/352,047

(22) Filed: Nov. 15, 2016

(65) Prior Publication Data

US 2017/0147360 A1 May 25, 2017

(30) Foreign Application Priority Data

Nov. 24, 2015 (GB) .................................. 1520678.2

(51) Int. Cl.
*G06F 21/32* (2013.01)
*H04L 12/24* (2006.01)
(Continued)

(52) U.S. Cl.
CPC ............ *G06F 9/4411* (2013.01); *G06F 21/32* (2013.01); *H04L 41/0806* (2013.01); *H04L 41/0809* (2013.01); *G06F 16/95* (2019.01)

(58) Field of Classification Search
CPC ...... G06F 9/4411; G06F 9/4415; G06F 13/10; G06F 13/12; G06F 11/3051;
(Continued)

(56) References Cited

U.S. PATENT DOCUMENTS 7,689,833 B2 3/2010 Lange
8,200,736 B2 6/2012 Shi et al.
(Continued)

FOREIGN PATENT DOCUMENTS

EP 2712454 A1 4/2014
WO 2003/093942 A2 11/2003
(Continued)

OTHER PUBLICATIONS

Behmann et al., "Collaborative Internet of Things (C-IoT):For Future Smart Connected Life and Business", Wiley, Apr. 2015, 339 pages.
(Continued)

*Primary Examiner* — Thomas J Cleary
(74) *Attorney, Agent, or Firm* — Alston & Bird LLP

(57) ABSTRACT

There are disclosed various methods and apparatuses for a device setup. In some embodiments of the method a signal from a peripheral device is detected by an apparatus and biometric data is received from the peripheral device. The biometric data is transmitted to a server. An indication whether the server has found biometric identification corresponding to the biometric data or other information indicative of that the apparatus and the peripheral device are attached to a same user is received from the server. If the indication reveals that the server has found biometric identification corresponding to the biometric data or other information indicative of that the apparatus and the peripheral device are attached to a same user configuration data is received from the server and used for configuring at least one of the apparatus and the peripheral device. In some embodiments the apparatus comprises means for implementing the method.

20 Claims, 6 Drawing Sheets

(51) Int. Cl.
*G06F 9/4401* (2018.01)
*G06F 16/95* (2019.01)

(58) Field of Classification Search
CPC .... G06F 17/30861; G06F 21/30; G06F 21/31; G06F 21/32; G06F 16/95; H04L 9/32; H04L 941/0809
See application file for complete search history.

(56) References Cited

U.S. PATENT DOCUMENTS

| | | | |
|---|---|---|---|
| 8,819,798 B2 | 8/2014 | Zises | |
| 8,886,316 B1 | 11/2014 | Juels | |
| 8,994,498 B2 | 3/2015 | Agrafioti et al. | |
| 9,026,053 B2* | 5/2015 | Molettiere | H04B 7/26 455/41.2 |
| 9,674,700 B2* | 6/2017 | John Archibald | H04W 12/06 |
| 9,681,471 B1* | 6/2017 | Kurian | H04W 76/10 |
| 2004/0117636 A1 | 6/2004 | Cheng | |
| 2010/0311482 A1 | 12/2010 | Lange | |
| 2011/0258689 A1* | 10/2011 | Cohen | H04L 63/061 726/7 |
| 2013/0005266 A1 | 1/2013 | Singh | |
| 2013/0117806 A1 | 5/2013 | Parthasarathy et al. | |
| 2014/0201400 A1* | 7/2014 | Beel | G06F 3/04842 710/63 |
| 2014/0325092 A1* | 10/2014 | Yockey | G06F 13/10 710/10 |
| 2015/0121514 A1* | 4/2015 | Park | G06F 21/34 726/19 |
| 2015/0278498 A1 | 10/2015 | Hong et al. | |
| 2015/0310444 A1* | 10/2015 | Chen | G06O 20/4016 705/44 |
| 2016/0057124 A1* | 2/2016 | Boyle | H04L 63/0861 726/7 |
| 2016/0364729 A1* | 12/2016 | Ruparelia | G06Q 20/40145 |
| 2018/0152821 A1* | 5/2018 | Sa | H04W 4/70 |

FOREIGN PATENT DOCUMENTS

| | | |
|---|---|---|
| WO | 2012/151680 A1 | 11/2012 |
| WO | 2015/031861 A1 | 3/2015 |

OTHER PUBLICATIONS

"Bump (Application)", Wikipedia, Retrieved on Oct. 21, 2016, Webpage available at : https://en.wikipedia.org/wiki/Bump_%28application%29.

"Electrocardiography", Wikipedia, Retrieved on Oct. 21, 2016, Webpage available at : https://en.wikipedia.org/wiki/Electrocardiography.

"The Password is Finally Dead: Launch of 1U Mobile App Eliminates Need for All Usernames and Passwords", PR Newswire, Retrieved on Oct. 21, 2016, Webpage available at : http://www.pmewswire.com/news-releases/the-password-is-finally-dead-launch-of-1u-mobile-app-eliminates-need-for-all-usernames-and-passwords-300005398.html.

Search Report received for corresponding United Kingdom Patent Application No. 1520678.2, dated Jun. 27, 2016 4 pages.

* cited by examiner

METHOD AND APPARATUS FOR DEVICE SETUP

TECHNICAL FIELD

The present invention relates to a method for device setup, an apparatus for device setup, and computer program for device setup.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

When a new device is taken into use or an old device is reset and restored, a setup process for the device may take a lot of time. The setup may involve, for example, manually performing a device pairing and other tasks such as reading a user manual to find out how the setup process should be performed. Furthermore, the user may also have to remember several device connections and passwords. To detect the user of the device the user may somehow identify her/himself to the devices which are restored or setup. The user may also have to remember how to enable pairing process in the peripheral device(s).

SUMMARY

Various embodiments provide a method and apparatus for a device setup. In accordance with an embodiment, there is provided a method for controlling, for example, setup, backup and restore of a device capable of measuring biometric signals. This configuration may include peripheral selection based on user's biometric data received from the peripheral device. The configuration may also include possibility to send certain configuration information to an apparatus although biometric identification has not been found but there exists other information indicative of that the apparatus and the peripheral device are attached to the same body.

Various aspects of examples of the invention are provided in the detailed description.

According to a first aspect, there is provided a method comprising:

receiving biometric data from the peripheral device;

transmitting the biometric data to a server;

receiving from the server indication whether the server has found information indicative of that the apparatus and the peripheral device are attached to a same user; and if the indication reveals that the server has found information indicative of that the apparatus and the peripheral device are attached to a same user, the method further comprises:

receiving from the server configuration data; and using the configuration data for configuring at least one of the apparatus and the peripheral device.

According to a second aspect, there is provided a method comprising:

receiving from an apparatus biometric data relating to a peripheral device;

using the biometric data to search a biometric identification corresponding to the biometric data;

transmitting to the apparatus an indication indicative of whether biometric identification corresponding to the biometric data or other information indicative of that the apparatus and the peripheral device are attached to a same user has been found; and if biometric identification corresponding to the biometric data or other information indicative of that the apparatus and the peripheral device are attached to a same user has been found, retrieving configuration data related to the biometric indication; and transmitting the configuration data to the apparatus.

According to a third aspect, there is provided an apparatus comprising at least one processor; and at least one memory including computer program code the at least one memory and the computer program code configured to, with the at least one processor, cause the apparatus to perform at least the following:

receive biometric data from the peripheral device;

transmit the biometric data to a server;

receive from the server indication whether the server has found biometric identification corresponding to the biometric data or other information indicative of that the apparatus and the peripheral device are attached to a same user; and if the indication reveals that the server has found biometric identification corresponding to the biometric data or other information indicative of that the apparatus and the peripheral device are attached to a same user, the at least one memory and the computer program code are further configured to, with the at least one processor, cause the apparatus to perform at least the following:

receive from the server configuration data; and use the configuration data for configuring at least one of the apparatus and the peripheral device.

According to a fourth aspect, there is provided an apparatus comprising at least one processor; and at least one memory including computer program code the at least one memory and the computer program code configured to, with the at least one processor, cause the apparatus to perform at least the following:

receive from an apparatus biometric data relating to a peripheral device;

use the biometric data to search a biometric identification corresponding to the biometric data;

transmit to the apparatus an indication indicative of whether biometric identification corresponding to the biometric data or other information indicative of that the apparatus and the peripheral device are attached to a same user has been found; and if biometric identification corresponding to the biometric data or other information indicative of that the apparatus and the peripheral device are attached to a same user has been found, retrieve configuration data related to the biometric indication; and transmit the configuration data to the apparatus.

According to a fifth aspect, there is provided a computer readable storage medium stored with code thereon for use by an apparatus, which when executed by a processor, causes the apparatus to perform:

receive biometric data from the peripheral device;

transmit the biometric data to a server;

receive from the server indication whether the server has found biometric identification corresponding to the biometric data or other information indicative of that the apparatus and the peripheral device are attached to a same user;

receive from the server configuration data and use the configuration data for configuring at least one of the apparatus and the peripheral device, if the indication reveals that the server has found biometric identification corresponding to the biometric data or other information indicative of that the apparatus and the peripheral device are attached to a same user.

According to a sixth aspect, there is provided a computer readable storage medium stored with code thereon for use by an apparatus, which when executed by a processor, causes the apparatus to perform:

receive from an apparatus biometric data relating to a peripheral device;

use the biometric data to search a biometric identification corresponding to the biometric data;

transmit to the apparatus an indication indicative of whether biometric identification corresponding to the biometric data or other information indicative of that the apparatus and the peripheral device are attached to a same user has been found; and retrieve configuration data related to the biometric indication, if biometric identification corresponding to the biometric data or other information indicative of that the apparatus and the peripheral device are attached to a same user has been found; and transmit the configuration data to the apparatus.

According to a seventh aspect, there is provided an apparatus comprising:

means for receiving biometric data from the peripheral device;

means for transmitting the biometric data to a server;

means for receiving from the server indication whether the server has found biometric identification corresponding to the biometric data or other information indicative of that the apparatus and the peripheral device are attached to a same user; and wherein if the indication reveals that the server has found biometric identification corresponding to the biometric data or other information indicative of that the apparatus and the peripheral device are attached to a same user the means for receiving are adapted to receive configuration data from the server; and the apparatus further comprises means for using the configuration data for configuring at least one of the apparatus and the peripheral device.

According to an eighth aspect, there is provided an apparatus comprising:

means for receiving from a user device biometric data relating to a peripheral device;

means for using the biometric data to search a biometric identification corresponding to the biometric data;

means for transmitting to the user device an indication indicative of whether biometric identification corresponding to the biometric data or other information indicative of that the apparatus and the peripheral device are attached to a same user has been found; and means for retrieving configuration data related to the biometric indication, if biometric identification corresponding to the biometric data or other information indicative of that the apparatus and the peripheral device are attached to a same user has been found;

wherein the means for transmitting are further adapted to transmit the configuration data to the user device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
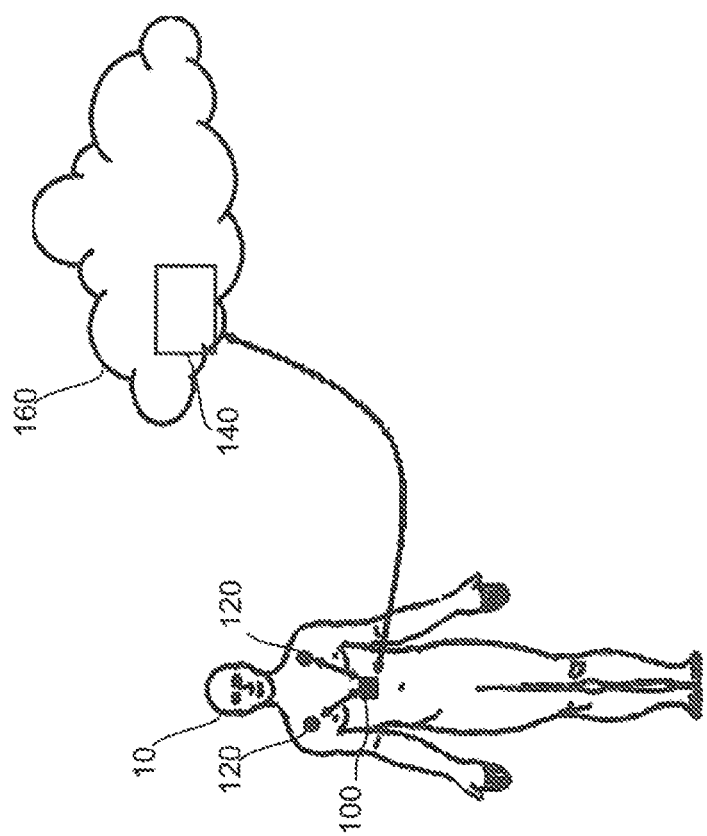
FIG. 1 shows an example of a use situation for device setup according to an example embodiment.

FIG. 1 depicts an example of a situation in which a user device 100 is intended to be used to measure medical status of a person 10, such as a patient in a hospital. Some peripheral devices 120 may also be used to measure some medical information related to the person 10. The user device 100 will be set up to operate as a gateway (GW) to a server 140 in a network 160. In accordance with an embodiment, the network 160 and servers 140 of the network 160 may also be called as a cloud. The network 160 may comprise not only one but a plurality of servers, nodes and other means to provide communication between the network and devices.

When the user device 100 capable of measuring and receiving biometric signals from peripheral devices 120 (e.g. from a medical health device) is taken into use and configured for a specific user 10, configuration of the user device 100 may be uploaded into the cloud, for example after the user device 100 has been configured and/or at a later phase. In addition, the user's biometric data, which may be used as a biometric identification for the user, may be transmitted into the cloud. The biometric data may consist, for example, electrical activity of the heart, information on an iris of the user, information of a fingerprint of the user, etc. The biometric data uploaded into the cloud could be raw data received from a measurement sensor or it can be pre-processed. The biometric data may be stored into the cloud/server 140 based on the biometric data. The stored biometric data may or may not include data collected from external peripheral devices 120. The biometric identification may be regarded to be associated with the user and may be unique for each user.

When a new device is taken into use or the current user device 100 has being reset, the user biometric data from the user device 100 and possible peripheral devices 120 in the vicinity may be sent to the cloud and the cloud/server 140 may examine whether biometric identification of the user has already been stored into the cloud/server 140. If biometric identification of the user has been found from the cloud/server 140, the biometric identification of the user and other information attached with the biometric identification of the user may be restored. This information may then be used to setup the user device 100 and possibly also connections to the peripheral device(s) 120. Thus, the biometric identification of the user may also be used to pair a device belonging to the same user, i.e. when a new device is taken into use, the device may discover and receive biometric data from available peripheral devices 120 to get biometric identification data from peripheral devices 120. This biometric data from peripheral devices 120 may then be used for determining which of the peripheral devices 120 in the vicinity are attached to the same user. After pairing the peripheral devices 120 with the user device 100, the user device 100 may also configure the peripheral devices 120. This configuration may include for example setting correct threshold parameters for the identified user.

In accordance with an embodiment, the peripheral device 120 may remain unpaired with the user device 100 until configuration information have been transmitted from the server 140 to the user device 100. Then, the user device 100 may use the configuration information to configure the peripheral device 120 and perform the pairing with the peripheral device 120.

In accordance with an embodiment, the biometric identification may not be available but there may be some other information indicative of that the user device 100 and the peripheral device 120 are attached with the same body. Hence, to perform the configuration the server 140 may send certain configuration information to the user device 100 which utilises this information in the configuration of the peripheral device 120.

The peripheral devices 120 may be able to communicate with the user device 100 using a so called short range communication connection, which may be a radio connection, an optical connection, an inductive connection, or another type of connection, either wireless or wired, suitable for short range communication between devices. A coverage area of the short range wireless communication connection may be, for example, several centimeters, several meters, tens of meters or hundreds of meters. When the peripheral devices 120 and the user device 100 are attached with the person or are near the person, coverage area of several meters may be sufficient. As an example, the short range connection may be based on Bluetooth Low Energy. Other non-limiting examples include technologies based on IEEE 802.15.4 (Institute of Electrical and Electronics Engineers) and IEEE 802.11.

On the other hand, the user device 100, when operating as the gateway, may be able to communicate to a wireless local area network (WLAN) and/or a wireless cellular telephone network, such as a global systems for mobile communications (GSM), universal mobile telecommunications system (UMTS), long term evolution (LTE) based network, code division multiple access (CDMA) network etc.

Figure 2:
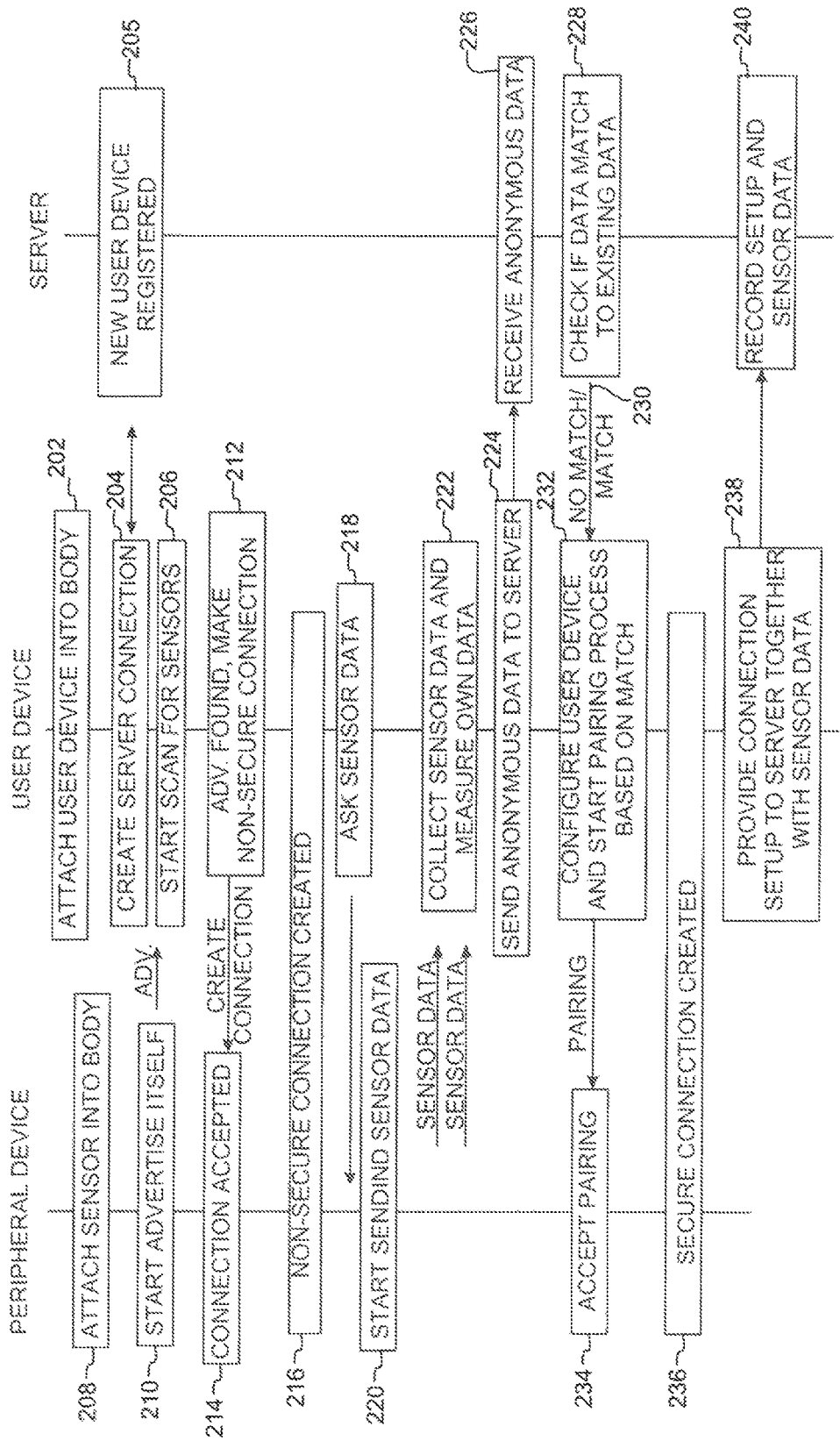
FIG. 2 illustrates as a flow diagram a process for device setup, in accordance with an embodiment.

In the following, a method to set up the user device 100 will be described in more detail with reference to FIG. 1 and the signalling diagram of FIG. 2, in accordance with an embodiment. In the example use case of FIG. 1 the user device 100 has been attached with the body of the patient 10 (block 202 in FIG. 2). The user device 100 will then be set up to be used to measure medical status of the patient 10. The user device 100 may act as the gateway for peripheral devices 120 in addition that the user device 100 may also itself measure the patient's 10 biometric data.

The user device 100 may perform a setup process by connecting to the server 140 of the network and possibly exchanging some information with the server 140 for the connection setup (block 204). The server 140 may register the user device 100 to a database in the server 140 and/or to another location in the network 160 (block 205). Established connection may then be used, among other things, to report biometric data to the server 140.

After the user device 100 has been attached with the body, the user device 100 may begin a peripheral discovery process. The user device 100 may scan for peripheral devices 120 and try to receive biometric data from available peripheral devices in the vicinity (block 206). The biometric data may be received from peripherals via a point-to-point connection between the user device 100 and the peripheral 120 or the peripheral devices 120 may broadcast the biometric data which the user device 100 may receive.

One or more peripheral devices 120 may have been attached with the body (block 208). The peripheral devices 120 may be, for example, a kind of sensors which are able to measure biometric signals from the patient 10, such as signals related to a heart of the patient 10. The peripheral devices 120 may start to advertise themselves by sending information about their existence (block 210). The peripheral devices 120 may transmit certain data in the advertisement which may be known by the user device 100 and may be used to detect which peripheral data should be transmitted to the server 140. These peripheral devices 120 may be, for example, those which are not connected to any user device and are capable of measuring biometric data.

If the user device 100 has received advertising information from a peripheral device 120 (or from multiple peripheral devices), the user device 100 may initiate a local connection setup to communicate with the peripheral device 120 (block 212). If the peripheral device 120 accepts the connection (block 214), a connection, which may at this stage be a non-secure connection, has been established (block 216).

In accordance with an embodiment, the user device 100 may also ask the peripheral device 120 to measure and provide certain biometric data. In addition the user device 100 may also measure its own biometric data, for example that kind of data that it has collected from the peripheral devices 120.

The user device 100 may now request sensor data (biometric data) from the peripheral device 120 (block 218). It should be noted in here that the user device 100 may collect data from all the peripherals it has selected and the user device 100 may not know yet if they are attached in the same body as the user device 100. The peripheral device 120 may send sensor data measures by the peripheral device 120 (block 220). The user device 100 may collect the sensor data from one or more peripheral devices 120 and may also measure own biometric data using biometric sensor(s) of the user device 100 (block 222).

When certain amount of data is collected, the user device 100 may send the collected biometric data to the server 140 as anonymous data (block 224) or the user device 100 may continuously send data collected from the peripheral devices 120 to the server 140. The server 140 may receive data transmitted from the user device 100 (block 226). After received the anonymous data, the server 140 may use the biometric data to build a biometric identification for the user device 100 and the peripheral devices 120 based on, for example, electrical activity of the heart of the patient 10, and the server 140 may check whether corresponding biometric identification can be found from the cloud (block 228). The server 140 may send an indication of the result of the check to the user device 100 (block 230). In other words, if corresponding data has been found, the server 140 may send a match indication, and if corresponding data has not been found, the server 140 may send a no match indication.

It should be noted that the server 140 may not use the biometric data as such but may first use the biometric data to form a biometric identification. In other words, some kind of conversion from the biometric data to the biometric identification may be performed, wherein this biometric identification may be used to find out whether corresponding biometric identification can be found from the cloud.

When the user device 100 has received the response from the server 140, the user device 100 may configure itself and perform a pairing process with the peripheral devices 120 attached with the patient 10 (block 232). Those peripheral devices 120 may accept the pairing, wherein they may communicate with the user device 100 (block 234). The connection(s) between the user device 100 and peripheral device(s) 120 may now be a secured connection(s) (block 236). Connection setup and sensor data from the peripheral devices 120 may be sent by the user device 100 to the server 140 (block 238). The server 140 may store the setup data and the sensor data to the cloud (block 240).

If the user device 100 manages to receive biometric data from a peripheral device 120, the user device 100 may store the data into a memory for later utilisation, as will be described later, or send it directly to the server 140. The biometric data may be stored with information of the identity of the peripheral device 120 from which the biometric data was transmitted.

It should be noted here that the above mentioned connection setup with the server 140 may be performed before, during or after receiving the biometric data from the peripheral devices 120.

The biometric identification and configuration data may be stored in the cloud and utilized, for example, when the user device 100 has been reset or replaced with a new device. In such a situation the user device 100 and the server 140 may establish a communication connection. The user device 100 may send biometric data received from peripheral devices to the server 140. The server 140 which receives the biometric data may use the biometric data to build a biometric identification for the user device 100 and the peripheral devices 120. If the server 140 discovers that the biometric identification received from the user device 100 matches to a biometric identification already available in the cloud the server 140 may conclude that configuration information for that user of the user device 100 has already been stored in the cloud. Hence, the server 140 may transmit the configuration information based on the biometric identification to the user device 100. The user device 100 may then use this information to configure itself and the peripheral devices 120.

The server 140 may also examine which peripheral devices 120 are attached with the user. This may be performed, for example, in such a way that the server 140 checks biometric data received from the peripheral devices 120 and compares them to the biometric identification related to the user device 100 or to biometric data measured by the user device 100. If the server 140 finds out that some biometric data received from the peripheral devices 120 matches to the biometric identification related to the user device 100 or to biometric data measured by the user device 100 the server 140 may deduce that the peripheral device(s) 120 which sent biometric data corresponding to the biometric information related to the user device 100 has been attached with the user 10. Hence, the server 140 may control the user device 100 to pair such peripheral device 120 or peripheral devices 120 which had the positive match.

The pairing process may also include that the server 140 sends configuration data for peripheral devices 120 to the user device 100 which may deliver the configuration data to a corresponding peripheral device 120. Some non-limiting examples of the configuration data is a threshold level or threshold levels, measurement accuracy and identification number assigned for the peripheral device 120.

If the server 140 finds out that no biometric identification data has been found from the server 140 matching with the biometric identification related to the user device 100, the server 140 may control the pairing of the user device 100 and the peripheral device(s) 120 if their mutual biometric identification data match, but the server 140 may not be able to send any configuration data to the user device 100. In such a situation a matching between the user and the device may be performed, for example, manually. This kind of matching may be performed, for example, as follows. The user device 100 may read an identifier, which may be a bar code, an RFID tag (radio frequency identification), a QR code (Quick Response) or another kind of code. The identifier includes the user's identification information ID with the user device 100. In accordance with an embodiment, the user's identification information may be input by some appropriate input means such as a keyboard, a keypad or a touch panel.

In accordance with an embodiment, in the above mentioned situation when the server 140 finds out that no biometric identification data has been found it may still be possible that the server 140 provides connectivity information to the user device 100 which the user device 100 can use to connect with the peripheral device 120 without user interaction.

Figure 3:
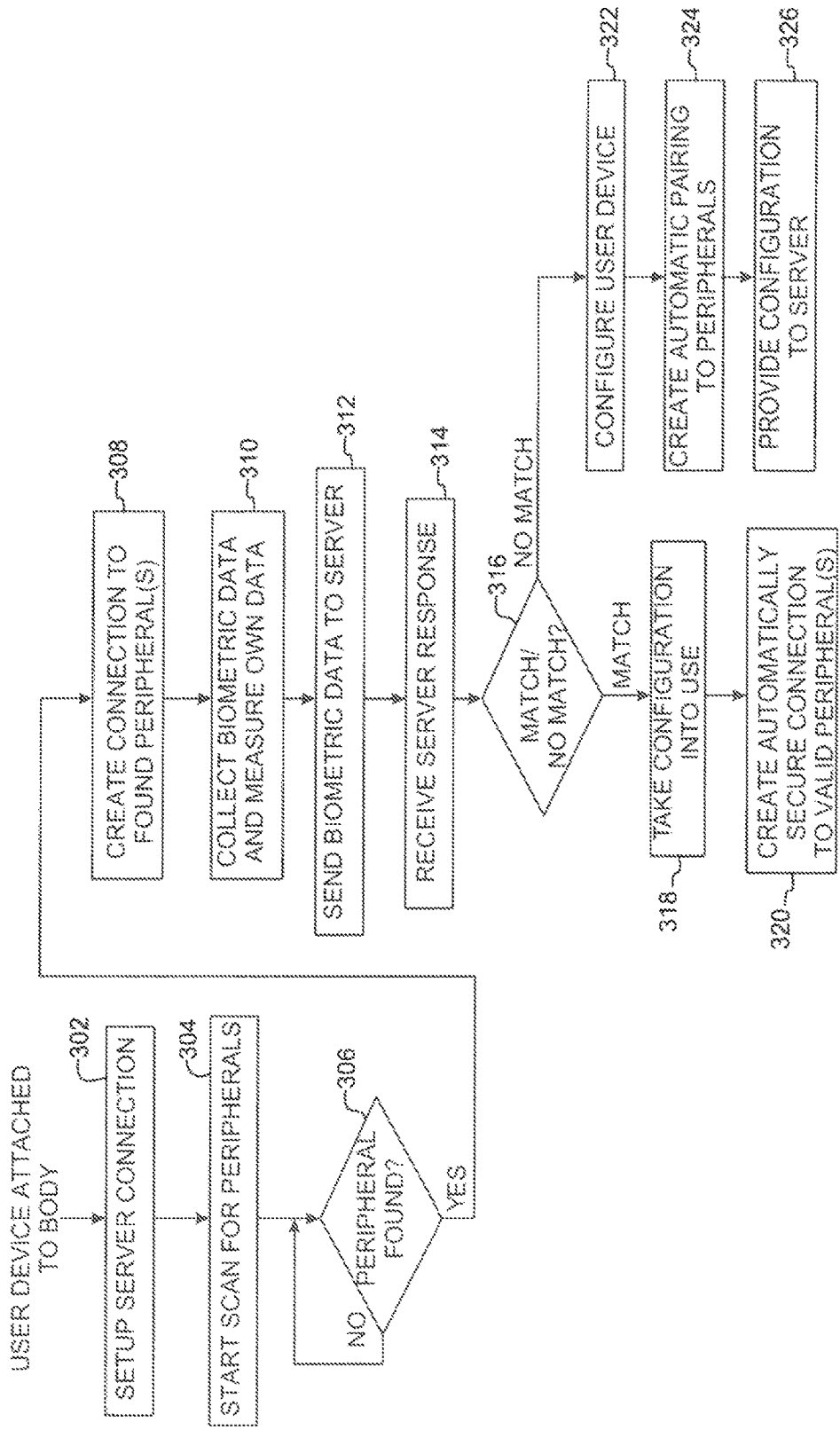
FIG. 3 illustrates as a flow diagram of the operation of a user device during the setup, in accordance with an embodiment.

FIG. 3 shows a flow diagram of the operation of the user device 100 during the setup, in accordance with an embodiment. The user device 100 performs the connection setup with the server 140 (block 302 in FIG. 3) and starts to scan peripheral devices 120 (block 304). The user device 100 may examine, whether a peripheral device 120 has been found (block 306). A found peripheral device 120 means in this context a peripheral device 120 from which signals can be detected by the user device 100. Additionally, it may be possible that also information on which kind of peripheral device the found peripheral device 120 is, has been obtained, such as a medical sensor. If one or more peripheral devices 120 have been found, the operation may continue from block 308 to create connection to that/those peripheral device(s) 120. If no peripheral devices 120 have been found, the user device 100 may repeat the examination of block 306 until a peripheral device 120 has been found or until another condition to stop searching has been reached.

When a connection to the found peripheral device(s) 120 has been formed, the user device 100 may begin to collect biometric data from the peripheral devices 120 and possibly measure its own data (block 310). Collected biometric data may be sent to the server 140 (block 312). Then, the user device 100 may wait the server response (block 314). In block 316 the user device 100 may examine whether the response from the server 140 was match or no match. In a situation in which the response was match, the operation may continue so that the user device 100 takes the configuration received from the server 140 with the response into use (block 318). Then, a secure connection between the user device 100 and the peripheral devices 120 may be established (block 320). In a situation in which the response was no match, the operation may continue so that the user device 100 is configured by other means, such as manually (block 322). In this context configuring the user device 100 may include the server 140 sends connectivity information, such as an address of a Bluetooth™ low energy device (BLE address), to the user device 100 so that the user device 100 may automatically make secure connection to a certain peripheral device 120. Then, automatic paring to peripheral devices 120 may be performed (block 324) and the created configuration may be provided to the server 140 (block 326).

One security challenge may be to make sure that the peripheral device 120 really is what it is claiming to be and in addition to make sure that the user device 100 is what it is claiming to be. The user device 100 may authenticate itself to the server 140 and in this point the server 140 may be able to provide to the user device 100 security keys of those peripheral devices 120 which are attached into the same body as the user device 100. Hence, the peripheral device 120 may deduce that the user device 100 is authenticated. In addition, data transmitted from the peripheral device 120 may be encrypted even before authentication, if the user device 100 is connected with the peripheral device 120. However, the user device 100, although it may be able to transfer the encrypted data to the server 140, may not reveal (understand) the contents of the data transmitted from the peripheral device 120. After the server 140 has authenticated the user device 100, the user device 100 may be able to read the data transmitted from the peripheral device 120.

Biometric data may comprise different kinds of information measured using different kinds of biometric sensors. Some non-limiting examples of such biometric data are information relating to heart, such as electrocardiogram (ECG, a.k.a. EKG), to a fingerprint, to an iris, to brains, such as electroencephalograph (EEG), etc. For example, the fingerprint and iris are unique for each person, wherein determining some features on the fingerprint or iris may provide means for identifying a person securely enough. Also the electrocardiogram may provide identification of a person. For example, the electrocardiogram may be measured for a certain amount of time and compared to a reference curve which has been obtained by averaging multiple of electrocardiograms obtained from different persons. Hence, a difference between the measured electrocardiogram and the reference curve may be used to form biometric identification.

In the following, examples of the user device 100, the peripheral device 120 and the server 140 will be explained in more detail with reference to the simplified block diagrams of FIGS. 4a, 4b and 4c, respectively. In accordance with an embodiment, the user device 100 depicted in FIG. 4a comprises a processor 101 for controlling the operation of the user device 100, a memory 102 for storing data and computer code to be executed by the processor 101, a first transceiver 103 for communicating with the peripheral devices 120, and a second transceiver 104 for communicating with the server 140. The user device 100 may also comprise one or more sensors 105 for measuring biometric data from the user 10. The user device 100 may further comprise a user interface (UI) 106 for displaying information to the user, for generating audible signals and/or for receiving user input.

Figure 4C:
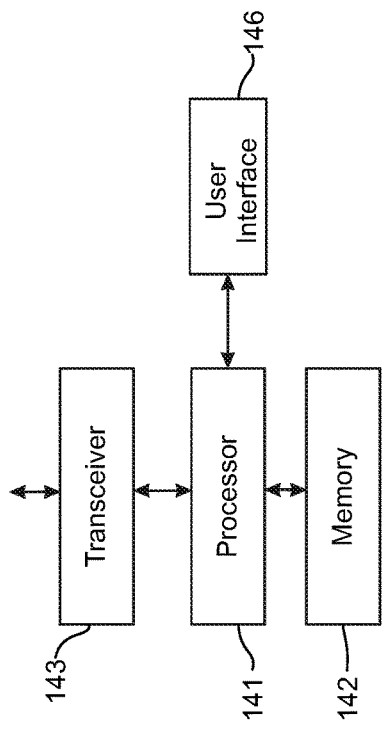
FIG. 4c illustrates as a simplified block diagram of a server, in accordance with an embodiment.
Figure 4A:
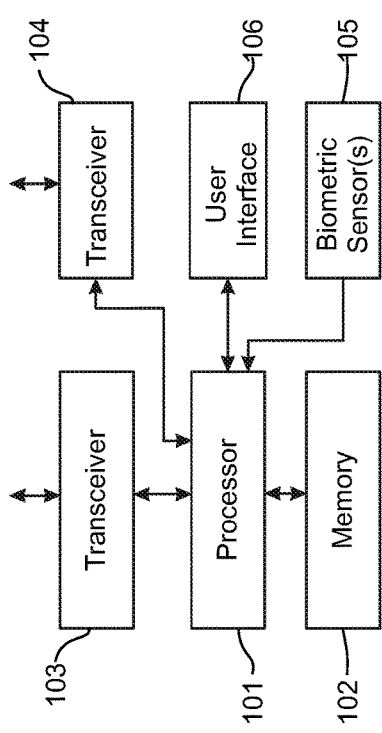
FIG. 4a illustrates as a simplified block diagram of a user device, in accordance with an embodiment.
Figure 4B:
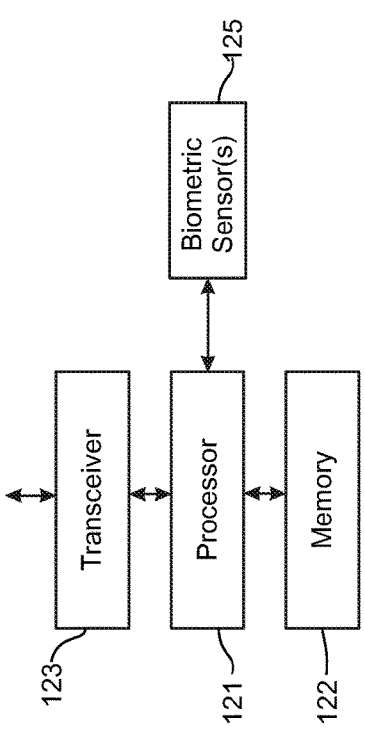
FIG. 4b illustrates as a simplified block diagram of a peripheral device, in accordance with an embodiment.

In accordance with an embodiment, the peripheral device 120 depicted in FIG. 4b comprises a processor 121 for controlling the operation of the peripheral device 120, a memory 122 for storing data and computer code to be executed by the processor 121, a transceiver 123 for communicating with the user device 100, and one or more sensors 125 for measuring biometric data from the user 10.

In accordance with an embodiment, the server 140 depicted in FIG. 4c comprises a processor 141 for controlling the operation of the server 140, a memory 142 for storing data and computer code to be executed by the processor 141, and a transceiver 143 for communicating with the user device 100 and other devices attached with the network. The server 140 may also comprise a user interface (UI) 146 for displaying information and/or for receiving user input.

Figure 6:
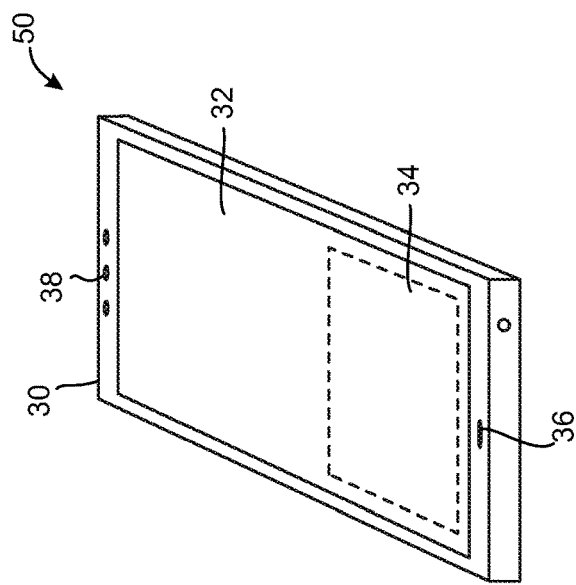
FIG. 6 shows an apparatus according to an example embodiment.
Figure 5:
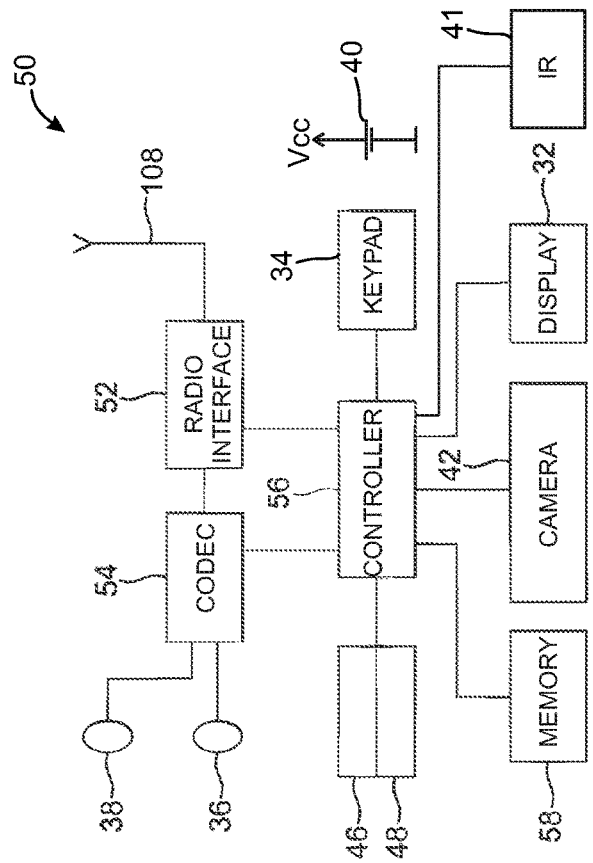
FIG. 5 shows a block diagram of an apparatus according to an example embodiment.

The following describes in further detail suitable apparatus and possible mechanisms for implementing the embodiments of the invention. In this regard reference is first made to FIG. 5 which shows a schematic block diagram of an exemplary apparatus or electronic device 50 depicted in FIG. 6, which may incorporate a transmitter according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 108 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 7:
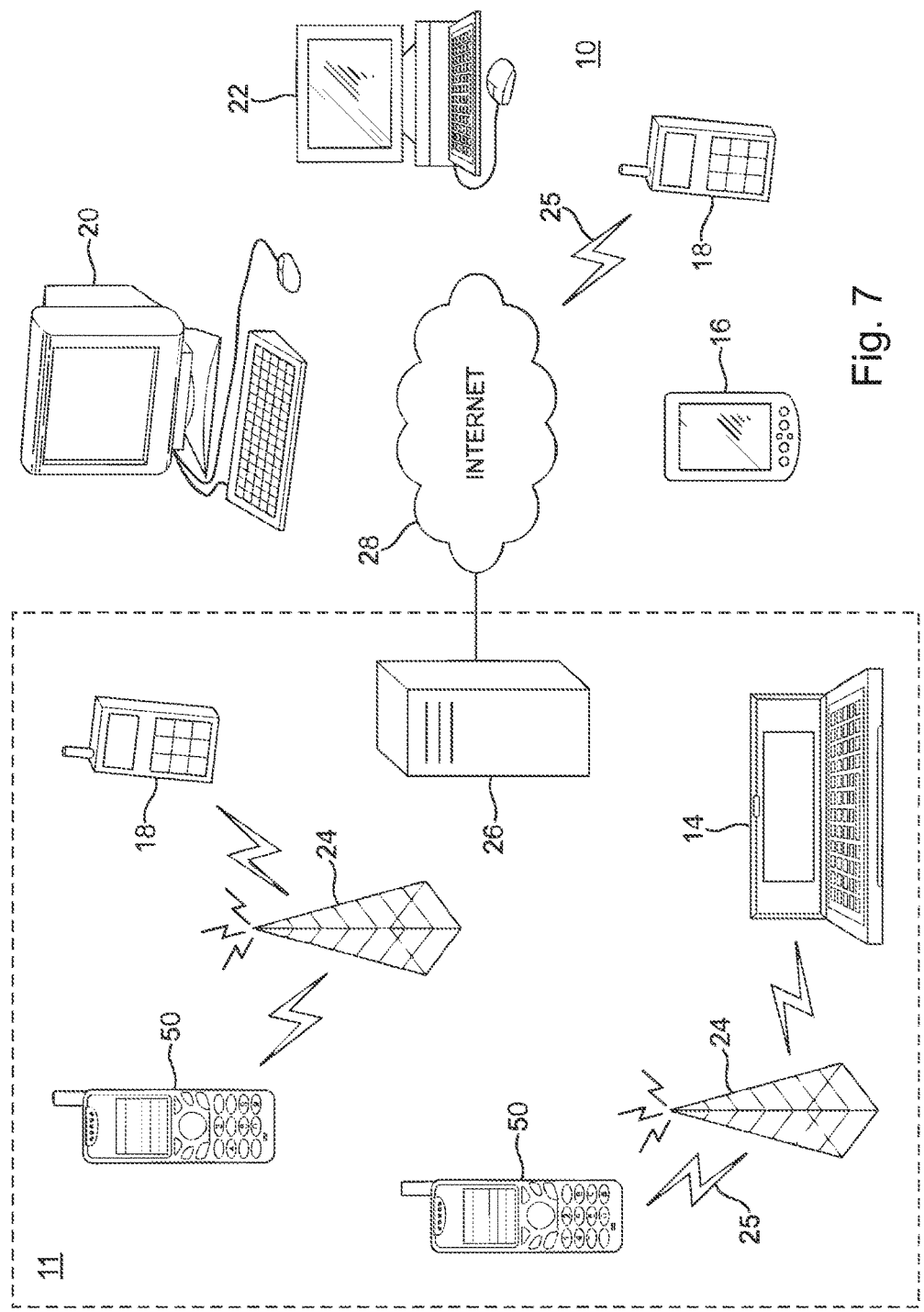
FIG. 7 shows an example of an arrangement for wireless communication comprising a plurality of apparatuses, networks and network elements.

With respect to FIG. 7, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 7 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

receiving biometric data from the peripheral device;

transmitting the biometric data to a server;

receiving from the server indication whether the server has found biometric identification corresponding to the biometric data; and if the indication reveals that the server has found biometric identification corresponding to the biometric data the method further comprises:

receiving from the server configuration data; and using the configuration data for configuring at least one of the apparatus and the peripheral device.

In some embodiments the method comprises:
if the indication reveals that the server has not found biometric identification corresponding to the biometric data the method further comprises:
forming configuration data related to at least one of the apparatus and the peripheral device;
associating the configuration data with a user of the apparatus; and
storing the configuration data.
In some embodiments the method comprises:
determining whether the peripheral device is attached to the same user as the user device.
In some embodiments the method comprises: pairing the peripheral device with the user device if the determination indicates that the peripheral device is attached to the same user as the user device.
In some embodiments the method comprises:
establishing a secured connection between the user device and the peripheral device attached to the same user.
In some embodiments the method comprises:
using the biometric data received from one or more peripheral devices to determine whether the peripheral device is attached to the same user as the user device.
In some embodiments the method comprises: measuring by the apparatus biometric data;
transmitting the biometric data measured by the apparatus to the server.

According to a second example, there is provided a method comprising:
receiving from an apparatus biometric data relating to a peripheral device;
using the biometric data to search a biometric identification corresponding to the biometric data;
transmitting to the apparatus an indication indicative of whether biometric identification corresponding to the biometric data has been found; and
if biometric identification corresponding to the biometric data has been found, retrieving configuration data related to the biometric indication; and
transmitting the configuration data to the apparatus.
In some embodiments the method comprises:
if the indication reveals that the server has not found biometric identification corresponding to the biometric data the method further comprises:
forming configuration data related to at least one of the apparatus and the peripheral device;
associating the configuration data with a user of the apparatus; and
storing the configuration data.
In some embodiments the method comprises:
determining whether the peripheral device is attached to the same user as the user device.
In some embodiments the method comprises:
using the biometric data received from one or more peripheral devices to determine whether the peripheral device is attached to the same user as the user device.
In some embodiments the method comprises:
receiving from the apparatus biometric data measured by the apparatus.

According to a third example, there is provided an apparatus comprising at least one processor; and at least one memory including computer program code the at least one memory and the computer program code configured to, with the at least one processor, cause the apparatus to perform at least the following:
receive biometric data from the peripheral device;
transmit the biometric data to a server;
receive from the server indication whether the server has found biometric identification corresponding to the biometric data or other information indicative of that the apparatus and the peripheral device are attached to a same user; and
if the indication reveals that the server has found biometric identification corresponding to the biometric data or other information indicative of that the apparatus and the peripheral device are attached to a same user, the at least one memory and the computer program code are further configured to, with the at least one processor, cause the apparatus to perform at least the following:
receive from the server configuration data; and
use the configuration data for configuring at least one of the apparatus and the peripheral device.

According to a fourth example, there is provided an apparatus comprising at least one processor; and at least one memory including computer program code the at least one memory and the computer program code configured to, with the at least one processor, cause the apparatus to perform at least the following:
receive from an apparatus biometric data relating to a peripheral device;
use the biometric data to search a biometric identification corresponding to the biometric data;
transmit to the apparatus an indication indicative of whether biometric identification corresponding to the biometric data or other information indicative of that the apparatus and the peripheral device are attached to a same user has been found; and
if biometric identification corresponding to the biometric data or other information indicative of that the apparatus and the peripheral device are attached to a same user has been found, retrieve configuration data related to the biometric indication; and transmit the configuration data to the apparatus.

According to a fifth example, there is provided a computer readable storage medium stored with code thereon for use by an apparatus, which when executed by a processor, causes the apparatus to perform:
receive biometric data from the peripheral device;
transmit the biometric data to a server;
receive from the server indication whether the server has found biometric identification corresponding to the biometric data or other information indicative of that the apparatus and the peripheral device are attached to a same user;
receive from the server configuration data and use the configuration data for configuring at least one of the apparatus and the peripheral device, if the indication reveals that the server has found biometric identification corresponding to the biometric data or other information indicative of that the apparatus and the peripheral device are attached to a same user.

According to a sixth example, there is provided a computer readable storage medium stored with code thereon for use by an apparatus, which when executed by a processor, causes the apparatus to perform:
receive from an apparatus biometric data relating to a peripheral device;
use the biometric data to search a biometric identification corresponding to the biometric data;
transmit to the apparatus an indication indicative of whether biometric identification corresponding to the biometric data or other information indicative of that the apparatus and the peripheral device are attached to a same user has been found; and
retrieve configuration data related to the biometric indication, if biometric identification corresponding to the biometric data or other information indicative of that the apparatus and the peripheral device are attached to a same user has been found; and transmit the configuration data to the apparatus.

According to a seventh example, there is provided an apparatus comprising:

means for receiving biometric data from the peripheral device;

means for transmitting the biometric data to a server;

means for receiving from the server indication whether the server has found biometric identification corresponding to the biometric data or other information indicative of that the apparatus and the peripheral device are attached to a same user; and wherein if the indication reveals that the server has found biometric identification corresponding to the biometric data or other information indicative of that the apparatus and the peripheral device are attached to a same user the means for receiving are adapted to receive configuration data from the server; and the apparatus further comprises means for using the configuration data for configuring at least one of the apparatus and the peripheral device.

In some embodiments the apparatus further comprises:
means for forming configuration data related to at least one of the apparatus and the peripheral device, if the indication reveals that the server has not found biometric identification corresponding to the biometric data;

means for associating the configuration data with a user of the apparatus; and means for storing the configuration data. In some embodiments the apparatus further comprises:

means for determining whether the peripheral device is attached to the same user as the user device.

In some embodiments the apparatus further comprises:
means for pairing the peripheral device with the user device if the determination indicates that the peripheral device is attached to the same user as the user device.

In some embodiments the apparatus further comprises:
means for establishing a secured connection between the user device and the peripheral device attached to the same user.

In some embodiments the apparatus further comprises:
means for using the biometric data received from one or more peripheral devices to determine whether the peripheral device is attached to the same user as the user device.

In some embodiments the apparatus further comprises:
means for measuring by the apparatus biometric data;

means for transmitting the biometric data measured by the apparatus to the server.

According to an eighth example, there is provided an apparatus comprising:

means for receiving from a user device biometric data relating to a peripheral device;

means for using the biometric data to search a biometric identification corresponding to the biometric data;

means for transmitting to the user device an indication indicative of whether biometric identification corresponding to the biometric data or other information indicative of that the apparatus and the peripheral device are attached to a same user has been found; and means for retrieving configuration data related to the biometric indication, if biometric identification corresponding to the biometric data or other information indicative of that the apparatus and the peripheral device are attached to a same user has been found;

wherein the means for transmitting are further adapted to transmit the configuration data to the user device.

In some embodiments the apparatus further comprises:
means for forming configuration data related to at least one of the apparatus and the peripheral device, if the indication reveals that biometric identification corresponding to the biometric data is not found;

means for associating the configuration data with a user of the apparatus; and means for transmitting the configuration data to the apparatus.

In some embodiments the apparatus further comprises:
means for determining whether the peripheral device is attached to the same user as the user device.

In some embodiments the apparatus further comprises:
means for using the biometric data received from one or more peripheral devices to determine whether the peripheral device is attached to the same user as the user device.

In some embodiments the apparatus further comprises:
means for receiving from the apparatus biometric data measured by the apparatus.

The invention claimed is:

1. A method comprising:
   receiving, at a user device, biometric data from a peripheral device;
   causing the user device to collect other biometric data from a wearer of the user device;
   transmitting the biometric data and the other biometric data to a server;
   receiving from the server an indication as to whether the server has compared the biometric data and the other biometric data to determine that the apparatus and the peripheral device are attached to a same user; and
   in an instance in which the user device receives the indication that the user device and the peripheral device are attached to the same user, receiving from the server configuration data associated with the same user, and using the configuration data for configuring at least one of the user device and the peripheral device,
   wherein the configuration data comprises at least one of a threshold level, a measurement accuracy, or an identification number assigned to the peripheral device.

2. The method according to claim 1, wherein the information indicative of the user device and the peripheral device being attached to the same user is based on a biometric identification corresponding to the biometric data.

3. The method according to claim 1 further comprising:
   determining whether the peripheral device is attached to the same user as the user device;
   pairing the peripheral device with the user device if the determination indicates that the peripheral device is attached to the same user as the user device.

4. A method comprising:
   receiving, from a user device, biometric data relating to a peripheral device and other biometric data collected by the user device from a wearer of the user device;
   determining whether at least a portion of the biometric data is a same type and is associated with a same period as a corresponding portion of the other biometric data;
   using the biometric data or the other biometric data to search a database for a biometric identification corresponding to the biometric data or the other biometric data;
   transmitting to the user device an indication indicative of whether the user device and the peripheral device are attached to a same user; and
   in an instance in which the user device and the peripheral device are attached to the same user, retrieving configuration data related to the user device or the peripheral device, and transmitting the configuration data to the user device,
wherein the configuration data comprises at least one of a threshold level, a measurement accuracy, or an identification number assigned for the peripheral device.

5. The method according to claim 4, wherein the information indicative of the user device and the peripheral device being attached to the same user is based on a biometric identification corresponding to the biometric data.

6. The method according to claim 4, further comprising:
determining whether the peripheral device is attached to the same user as the user device;
using the configuration data received from peripheral device to determine whether the peripheral device is attached to the same user as the user device.

7. An apparatus comprising at least one processor and at least one memory including computer program code, the at least one memory and the computer program code configured to, with the at least one processor, cause the apparatus to perform at least the following:
receive, at the apparatus, biometric data from a peripheral device;
cause the apparatus to collect other biometric data from a wearer of the apparatus;
transmit the biometric data and the other biometric data to a server;
receive from the server an indication as to whether the server has compared the biometric data and the other biometric data to determine that the apparatus and the peripheral device are attached to a same user; and
in an instance in which the user device receives the indication that the apparatus and the peripheral device are attached to the same user, the at least one memory and the computer program code are further configured to, with the at least one processor, cause the apparatus to perform at least the following:
receive, from the server configuration data comprising at least one of a threshold level, a measurement accuracy, or an identification number assigned for the peripheral device; and
use the configuration data for configuring at least one of the apparatus or the peripheral device.

8. The apparatus according to claim 7, wherein the information indicative of the apparatus and the peripheral device being attached to the same user is based on the biometric identification corresponding to the biometric data.

9. The apparatus according to claim 7, wherein, in an instance in which the indication reveals that the server has not found biometric identification corresponding to the biometric data, the at least one memory and the computer program code are configured to, with the at least one processor, cause the apparatus to perform at least the following:
form the configuration data related to at least one of the apparatus and the peripheral device;
associate the configuration data with the same user of the apparatus; and
store the configuration data.

10. The apparatus according to claim 7, wherein the at least one memory and the computer program code are configured to, with the at least one processor, cause the apparatus to perform at least the following:
determine whether the peripheral device is attached to the same user as the apparatus.

11. The apparatus according to claim 10, wherein the at least one memory and the computer program code are configured to, with the at least one processor, cause the apparatus to perform at least the following:
pair the peripheral device with the apparatus if the determination indicates that the peripheral device is attached to the same user as the apparatus.

12. The apparatus according to claim 10, wherein the at least one memory and the computer program code are configured to, with the at least one processor, cause the apparatus to perform at least the following:
establish a secured connection between the apparatus and the peripheral device attached to the same user.

13. The apparatus according to claim 10, wherein the at least one memory and the computer program code are configured to, with the at least one processor, cause the apparatus to perform at least the following:
use the biometric data received from the peripheral device and the other biometric data collected from the wearer of the apparatus to determine whether the peripheral device is attached to the same user as the apparatus.

14. The apparatus according to claim 7, wherein the at least one memory and the computer program code are configured to, with the at least one processor, cause the apparatus to perform at least the following:
measure, by the apparatus, the other biometric data;
transmit the other biometric data measured by the apparatus to the server.

15. An apparatus comprising at least one processor; and at least one memory including computer program code, the at least one memory and the computer program code configured to, with the at least one processor, cause the apparatus to perform at least the following:
receive, from a user device, biometric data relating to a peripheral device and other biometric data measured by the user device and associated with a wearer of the user device;
determine whether at least a portion of the biometric data is a same type and is associated with a same period as a corresponding portion of the other biometric data;
use the biometric data or the other biometric data to search a database for a biometric identification corresponding to the biometric data or the other biometric data;
transmit, to the user device, an indication indicative of whether the user device and the peripheral device are attached to a same user; and
in an instance in which the user device and the peripheral device are attached to the same user, retrieve configuration data related to the user device or the peripheral device, and transmit the configuration data to the user device,
wherein the configuration data comprises at least one of a threshold level, a measurement accuracy, or an identification number assigned for the peripheral device.

16. The apparatus according to claim 15, wherein the information indicative of the user device and the peripheral device being attached to the same user is based on the biometric identification corresponding to the biometric data or the other biometric data.

17. The apparatus according to claim 15, wherein, in an instance in which the indication reveals that the biometric identification corresponding to the biometric data or the other biometric data is not found, the at least one memory and the computer program code are configured to, with the at least one processor, cause the apparatus to perform at least the following:
form the configuration data related to at least one of the user device and the peripheral device;

associate the configuration data with the same user of the user device; and transmit the configuration data to the user device.

18. The apparatus according to claim 15, wherein the same type of biometric data is related to one of an electrocardiogram, a heart rate, an iris characteristic, a blood pressure, or an electroencephalograph; and wherein the at least one memory and the computer program code are configured to, with the at least one processor, cause the apparatus to perform at least the following:

determine whether the peripheral device is attached to the same user as the user device.

19. The apparatus according to claim 18, wherein the at least one memory and the computer program code are configured to, with the at least one processor, cause the apparatus to perform at least the following:

compare the biometric data received from the peripheral device to the other biometric data collected by the user device to determine whether the peripheral device is attached to the same user as the user device.

20. The apparatus according to claim 15, wherein the at least one memory and the computer program code are configured to, with the at least one processor, cause the apparatus to perform at least the following:

cause the user device to measure the other biometric data associated with the wearer of the user device; and receive, from the user device, the other biometric data measured by the user device.

\* \* \* \* \*